(12) United States Patent
Te Velde

(10) Patent No.: US 11,484,148 B2
(45) Date of Patent: Nov. 1, 2022

(54) COFFEE BREWING APPARATUS AND METHOD

(71) Applicant: KONINKLIJKE PHILIPS N.V., Eindhoven (NL)

(72) Inventor: Mart Kornelis-Jan Te Velde, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 399 days.

(21) Appl. No.: 16/650,833

(22) PCT Filed: Sep. 18, 2018

(86) PCT No.: PCT/EP2018/075110
§ 371 (c)(1),
(2) Date: Mar. 25, 2020

(87) PCT Pub. No.: WO2019/063337
PCT Pub. Date: Apr. 4, 2019

(65) Prior Publication Data
US 2020/0275798 A1  Sep. 3, 2020

(30) Foreign Application Priority Data
Sep. 26, 2017 (EP) .................... 17193105

(51) Int. Cl.
*A47J 31/52* (2006.01)
*A47J 31/00* (2006.01)
*A47J 31/42* (2006.01)

(52) U.S. Cl.
CPC ......... *A47J 31/5255* (2018.08); *A47J 31/002* (2013.01); *A47J 31/42* (2013.01)

(58) Field of Classification Search
CPC ....... A47J 31/002; A47J 31/42; A47J 31/5255
See application file for complete search history.

(56) References Cited

U.S. PATENT DOCUMENTS

2013/0133520 A1\* 5/2013 Hulett ................. A47J 42/38
99/290
2014/0178559 A1 6/2014 Neace, Jr.
(Continued)

FOREIGN PATENT DOCUMENTS

CN 102273939 A 12/2011
DE 202005020774 U1 7/2006
(Continued)

OTHER PUBLICATIONS

Search report for PCT/EP2018/075110 dated Nov. 16, 2018.

*Primary Examiner* — Anthony J Weier
(74) *Attorney, Agent, or Firm* — Maschoff Brennan

(57) ABSTRACT

Provided is an apparatus for preparing a coffee beverage portion from a volume of water and a mass of coffee beans. The apparatus includes a brewing chamber for containing the ground coffee. The chamber admits water via an inlet. The water contacts the ground coffee contained within the chamber, and exits the chamber via an outlet. A ground coffee supplier dispenses coffee beans to the chamber, and a water supply supplies water to the chamber. A controller controls the ground coffee supplier and the water supply such that the coffee beverage portion is brewed in a plurality of brewing steps. Each brewing step includes passing a fraction of the water volume through the chamber so as to contact a further fraction of the coffee beans mass during a time period equal to the desired brewing time. Further provided is a method of preparing a coffee beverage portion.

17 Claims, 2 Drawing Sheets

(56) References Cited

U.S. PATENT DOCUMENTS

2015/0157168 A1 6/2015 Burrows
2020/0138230 A1* 5/2020 Webster .............. A47J 31/5251

FOREIGN PATENT DOCUMENTS

| DE | 102009032677 A1 | 1/2011 |
| DE | 102015109921 A1 | 12/2016 |
| EP | 0139849 B1 | 12/1986 |
| WO | 2016025667 A1 | 2/2016 |
| WO | 2016160979 A1 | 10/2016 |

* cited by examiner

COFFEE BREWING APPARATUS AND METHOD

CROSS-REFERENCE TO RELATED APPLICATION

This application is a U.S. National Phase application under 35 U.S.C. § 371 of International Application No. PCT/EP2018/075110, filed on Sep. 18, 2018, which claims the benefit of European Application No. 17193105.8 filed on Sep. 26, 2017. These applications are hereby incorporated by reference herein.

FIELD OF THE INVENTION

The present invention relates to an apparatus and method for preparing a coffee beverage.

BACKGROUND OF THE INVENTION

Automated coffee machines are becoming increasingly popular owing to their capability to dispense a cup of coffee at the touch of a button. Such machines tend to operate by passing heated water through a bed of ground coffee beans in order to brew the coffee.

During brewing, a number of different compounds are extracted from the coffee beans in order to give the brewed coffee its characteristic taste and color. During the extraction process caffeine may be extracted from the coffee beans, thereby providing the consumer with the well-known stimulant effect associated with brewed coffee.

Coffee beans are known also to contain the diterpene compounds kahweol and cafestol. It has been suggested that these diterpene compounds may act as agonist ligands for certain nuclear receptors, including the farnesoid X receptor and the pregnane X receptor. These diterpenes may thus block cholesterol homeostasis and therefore cause raised cholesterol levels (Ricketts et al. *Mol. Endocrinol.* vol. 21, issue 7, 2007, 1603-1616).

Non-filter coffee in particular may contain relatively higher levels of kahweol and cafestol which have been associated with increased low density lipoprotein cholesterol levels.

Brewing coffee having the desired taste characteristics but in such a way as to limit the extraction of these diterpene compounds is thus an important goal. It would also be particularly desirable to prepare a coffee beverage with a lower diterpene content in an automated manner.

WO 2016/160979 A1 discloses a pour-over coffee brewer apparatus.

DE 20 2005 020774 U1 discloses a coffee machine, in particular a fully automatic espresso machine.

DE 10 2009 032677 A1 discloses a coffee machine for preparing coffee and espresso.

DE 10 2015 109921 A1 discloses a method for producing a coffee beverage.

SUMMARY OF THE INVENTION

The present invention seeks to provide an apparatus and method for preparing a coffee beverage portion in such a way as to maintain taste characteristics whilst limiting the extraction of diterpene compounds such as kahweol and cafestol.

The invention is defined by the claims.

According to an aspect of the present invention there is provided an apparatus for preparing a coffee beverage portion from a volume of water and a mass of ground coffee, the apparatus comprising:
a brewing chamber for containing the ground coffee and allowing the water to pass therethrough;
a ground coffee supplier for dispensing ground coffee to the brewing chamber;
a water supply for supplying water to the brewing chamber; and
a controller adapted to:
control the ground coffee supplier and the water supply such that the coffee beverage portion is brewed in a plurality of brewing steps, wherein each brewing step comprises passing a fraction of said volume through the chamber so as to contact a further fraction of said mass, the controller being configured to, in each brewing step, control the ground coffee supplier to dispense said further fraction to the brewing chamber, and wherein the controller is adapted to implement the plurality of brewing steps sequentially.

The present invention is partly based on the realization that the diterpene, i.e. kahweol and cafestol, content in a coffee beverage brewed by passing water through a brewing chamber containing ground coffee can be reduced by lowering the velocity of the water through the chamber. This can be realized by reducing the flow rate of the water for a given brew chamber geometry. The flow rate is defined as the volume of water divided by the time it takes to pass through the chamber. The use of the word 'further' in the term 'further fraction' (of the mass) is simply used to distinguish this term from the term 'fraction' (of the volume).

This apparatus takes longer to prepare a given volume of coffee than a conventional apparatus, in that the water flow rate is reduced, and this reduced flow is applied only to a fraction of the ground coffee. The coffee is thus prepared in multiple stages. For example, the flow rate may be halved and the coffee may be prepared in two stages, each stage using half of the ground coffee required for the eventual full coffee volume (which is termed "a coffee beverage portion"). By providing multiple stages, the taste is preserved in that the ground coffee is only brewed for the desired amount of time, which remains constant even though the flow rate has been reduced.

Brewing the coffee in this way ensures that the parameters linked to diterpene (water velocity) is reduced and that the parameters linked to taste (contact time, coffee/water ratio) remain the same as brewing the full coffee volume in one go.

The coffee beverage portion is made from a volume of water and a mass of ground coffee beans. The controller operates the apparatus to achieve a particular brewing time (i.e. the time water is in contact with the ground coffee) by selecting a suitable water flow rate, based on, for instance, the volume, mass, desired strength of the coffee beverage portion etc. Accordingly, this brewing time may ensure that the coffee beverage portion has the desired taste characteristics.

The controller controls the ground coffee supplier and the water supply to implement a plurality of brewing steps. The time period for each brewing step is equal to the brewing time. However, each brewing step utilizes a fraction of the volume of water and a further fraction of the mass of ground coffee beans. Thus, the volume of water employed for each of the brewing steps is less than the total volume for the full coffee beverage portion. Accordingly, the flow rate of the water through the chamber, and the ground coffee contained therein, is lower for each of the brewing steps than, for instance, the scenario in which the entire volume is passed through the mass of ground coffee in a single brewing step during the same brewing time.

In this manner, a coffee beverage is produced having the desired taste characteristics, due to the defined brewing time being used for each brewing step, but with a lower diterpene content due to the lower flow rate in each of the brewing steps as compared to the single brewing step scenario. Moreover, this solution may be implemented in existing coffeemaker designs without requiring any physical modification of their components, such as enlarging the opening to the brewing chamber.

A ratio between the fraction and the further fraction may be equal to a further ratio between the volume and the mass. Accordingly, the taste characteristics of each coffee aliquot produced by each brewing step, and the resulting coffee beverage portion in which the aliquots are combined, may match those of the product of a single brewing step using the same overall mass and volume, and the same brewing time.

The fraction may be half of the volume and the further fraction may be half of the mass. Thus the controller implements a simple two-brewing step process resulting in a coffee beverage portion having a lower diterpene content.

The water supply may be adapted to supply heated water. Brewing coffee may be facilitated by use of heated water due to more facile extraction of various compounds from the coffee beans. A temperature of the heated water may be the same for each of the plurality of brewing steps. The same brewing conditions may thus be used in each of the brewing steps as, for instance, for a single brewing step process using this heated water. Accordingly, the coffee beverage portion may have comparable taste characteristics with respect to those of the product of such a single brewing step process.

The apparatus may comprise a discharge for releasing the ground coffee from the brewing chamber. The controller may be adapted to control the discharge to release the further fraction following the respective brewing step. By releasing the used ground coffee following the respective brewing step, the brewing chamber may be vacated for further brewing steps. This may enhance the control which may be exercised over the taste characteristics of the coffee beverage portion, i.e. since fresh ground coffee replaces spent ground coffee for each brewing step.

The controller is adapted to implement the plurality of brewing steps sequentially. Such sequential implementation of the plurality of brewing steps may, for instance, be appropriate when the apparatus comprises a single brewing chamber.

The apparatus may comprise a plurality of brewing chambers, each having a respective ground coffee supplier and a respective water supply, wherein the controller is adapted to implement at least some of the plurality of brewing steps concurrently in the plurality of brewing chambers. In this manner, the coffee beverage portion may, for instance, be prepared in a shorter time.

The apparatus may comprise a user interface adapted to enable user input of parameters relating to the coffee beverage portion. The user interface may be adapted to enable user input of information relating to the volume and/or the mass. The controller may define the brewing time using this information.

The user interface may be adapted to enable user input for selecting brewing with a plurality of brewing steps, or brewing with a single brewing step. In this way, the apparatus is able to perform more rapid conventional brewing with a single brewing step or the slower multiple step brewing method to reduce the diterpene content.

The apparatus then implements different water flow rates in the two different modes. Different flow rates may be implemented by using a controllable valve between the water supply and the brewing chamber, or by controlling the water delivery pump, for example by applying duty cycle control.

The apparatus preferably comprises a beans chamber for receiving coffee beans and a grinding arrangement for grinding the beans to provide the ground coffee. By incorporating the grinder in the apparatus, the requisite grind size of the coffee beans may be provided, i.e. for each of the respective brewing steps, such that the requisite taste characteristics of the coffee beverage portion may be attained.

According to a further aspect of the present invention there is provided a method of preparing a coffee beverage portion from a mass of ground coffee and a volume of water in a brewing chamber, the method comprising: brewing the coffee beverage portion in a plurality of brewing steps, wherein each brewing step comprises passing a fraction of the volume through the brewing chamber so as to contact a further fraction of the mass during a time period equal to the brewing time.

A ratio between the fraction and the further fraction may be equal to a further ratio between the volume and the mass. Accordingly, the taste characteristics of the coffee aliquot produced by each brewing step, and the resulting coffee beverage portion in which these aliquots are combined, may match those of the product of a single brewing step using the same overall mass and volume, and the same brewing time.

At least some of the plurality of brewing steps are implemented sequentially, e.g. in a single brewing chamber.

BRIEF DESCRIPTION OF THE DRAWINGS

Embodiments of the invention are described in more detail and by way of non-limiting examples with reference to the accompanying drawings, wherein.

and

Figure 3:
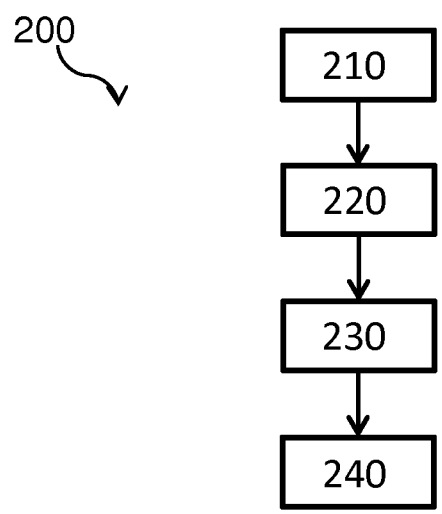

FIG. 3 shows a flowchart of a method according to an embodiment;

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Provided is an apparatus for preparing a coffee beverage portion from a volume of water and a mass of ground coffee. The apparatus comprises a brewing chamber for containing the ground coffee. The chamber admits water via an inlet. The water contacts the ground coffee contained within the chamber, and exits the chamber via an outlet. A ground coffee supplier dispenses ground coffee to the chamber, and a water supply supplies water to the chamber. A controller defines a desired brewing time or water flow rate for the coffee (for example dependent on user input) and controls the ground coffee supplier and the water supply such that the coffee beverage portion is brewed in a plurality of brewing steps. Each brewing step comprises passing a fraction of the water volume through the chamber so as to contact an associated fraction of the ground coffee mass during a time period equal to the desired brewing time.

The present invention is partly based on the realization that the diterpene, i.e. kahweol and cafestol, content in a coffee beverage brewed by passing water through a brewing chamber containing ground coffee may be reduced by lowering the flow rate of the water through the chamber. Without wishing to be bound by any particular theory, lower flow rates result in less extraction of such diterpene compounds. The flow rate (FR) is defined in Equation 1.

$$FR = V/t \qquad \text{Equation 1}$$

where V is the volume of liquid, i.e. water, passing through the brewing chamber and t is the time taken for the volume of liquid to pass through the brewing chamber.

A coffee beverage portion is made from a volume of water and a mass of ground coffee. As is well-known per se, a desired brewing time may be determined according to, for example, this volume, this mass, the desired strength of the coffee beverage portion etc. Defining this desired brewing time accordingly may assist to ensure that the coffee beverage portion has the desired taste characteristics.

In order to decrease FR, V may be reduced. In an embodiment, this is achieved by preparing the coffee beverage portion in a plurality of brewing steps; each brewing step utilizing a fraction of the volume of water required for the coffee beverage portion. Thus the volume of water employed for each of the brewing steps is less than the total volume for the coffee beverage portion. The lower FR which results, i.e. in each of the brewing steps, means that the diterpene content in the resultant coffee beverage portion may be decreased relative to, for instance, a coffee beverage portion of the same volume prepared in a single brewing step, and using the same brewing time, t.

The same brewing time, t, is used for each brewing step such that the resulting coffee beverage portion, which combines the coffee aliquots from each of the plurality of brewing steps, may have comparable taste characteristics as, for instance, a coffee beverage prepared in a single brewing step using this brewing time, t. Given that other brewing parameters such as the grind size, the brewing time, the brew pressure (because the pressure drop over the ground coffee is generally dependent on the pressure drops across the valves in the appliance which remains substantially constant) the water temperature, the (overall) mass of ground coffee beans, and the (overall) volume of water are the same as for such a single brewing step, the taste of the coffee beverage portion may be comparable to the product resulting from such a single brewing step process.

In an embodiment, a ratio between the fraction and the further fraction may be equal to a further ratio between the volume and the mass. Accordingly, the taste characteristics of each coffee aliquot produced in each brewing step, and the resulting coffee beverage portion in which these aliquots are combined, may match those of the product of a single brewing step using the same overall mass and volume, and the same brewing time.

It is also conceivable that the ratio and the further ratio may not be equal for every brewing step, providing that the overall volume of water and overall mass of ground coffee are used to prepare the coffee beverage portion.

In an embodiment, the fraction may be half of the (total) volume of water and the further fraction may be half of the (total) mass of ground coffee. Thus, the controller implements a simple two-brewing step process resulting in a coffee beverage portion having a lower diterpene content. Alternatively, three, four or more brewing steps may be used, e.g. using one third, one quarter or less of the volume and mass in each step.

Figure 1:
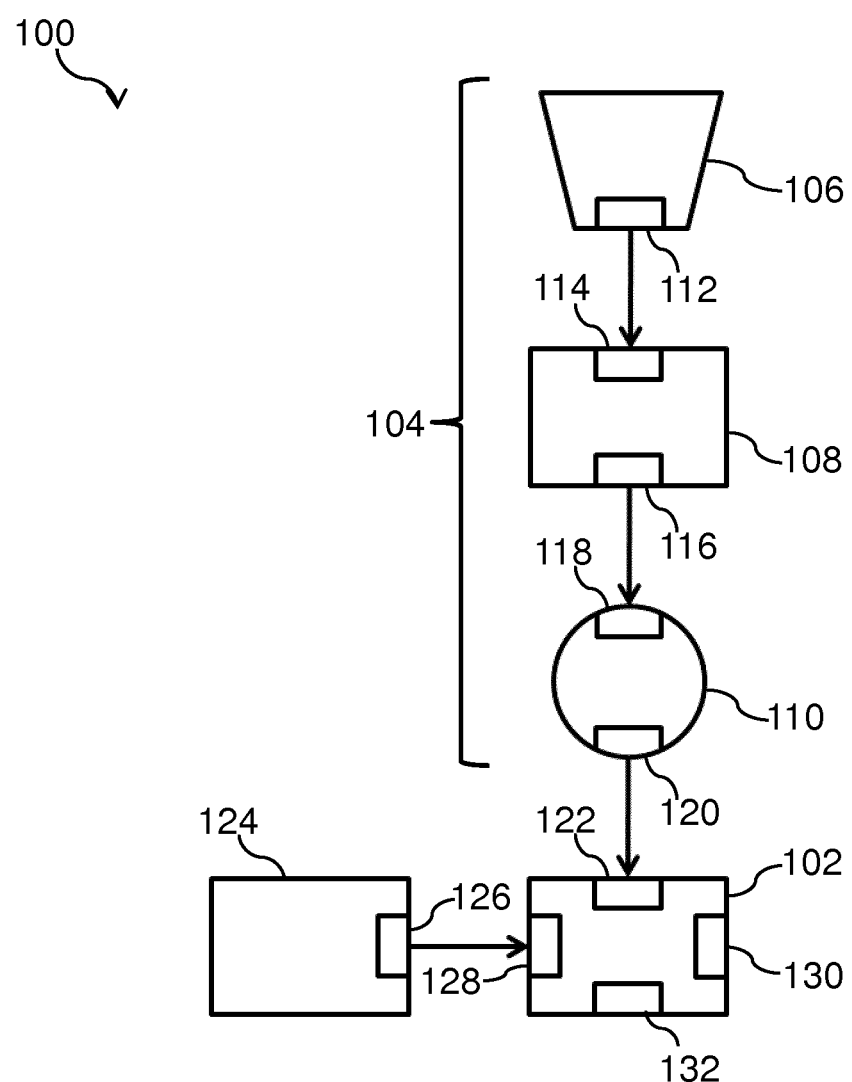
FIG. 1 schematically depicts an apparatus according to an embodiment.

FIG. 1 schematically depicts an apparatus 100 for preparing a coffee beverage portion according to an embodiment. The apparatus 100 comprises a brewing chamber 102 for containing ground coffee. Coffee brewing is carried out by passing water through the ground coffee contained in the brewing chamber 102. The brewing chamber 102 may, for instance, comprise a perforate portion (not shown) for supporting the ground coffee inside the brewing chamber 102. The holes of the perforate portion may be dimensioned to limit or prevent the passage of the ground coffee, but allow the water to pass through them.

The apparatus 100 has a ground coffee supplier 104 for dispensing ground coffee to the brewing chamber 102. In the non-limiting example shown in FIG. 1, the ground coffee supplier 104 comprises a coffee beans chamber 106, i.e. a hopper, a coffee dosing unit 108, and a grinder 110. Whilst the coffee dosing unit 108 is depicted in FIG. 1 as upstream of the grinder 110 such that the coffee dosing unit 108 controls the quantity of beans entering the grinder 110, it also equally conceivable that the coffee dosing unit 108 may be positioned downstream of the grinder 110 such that it controls the quantity of ground coffee beans being dispensed to the brewing chamber 102. In a fully automatic coffee machine, the amount of coffee is dosed based on the grind time, or number of rotations of a rotary grinding disc. There is then no separate dosing unit. A dosing unit may be used to ensure that the grinder is completely empty after dispensing coffee. This enables easy switching of bean types.

The coffee beans may pass from the coffee beans hopper 106 to the coffee dosing unit 108 via a coffee beans outlet 112 of the coffee beans hopper 106 and a coffee beans inlet 114 of the coffee dosing unit 108. The coffee beans outlet 112 may include, for instance, a mechanical or electromechanical shutter which controls the quantity of coffee beans passing out of the coffee beans hopper 106 by controlling an aperture size and/or opening time of the coffee beans outlet 112. The coffee dosing unit 108 may, for example, be employed to dose the mass of coffee beans required for the coffee beverage portion or for each brewing step.

The coffee dosing unit 108 may have a further coffee beans outlet 116 for supplying coffee beans from the coffee dosing unit 108 to the grinder 110. The coffee beans may enter the grinder 110 via the further coffee beans inlet 118. The further coffee beans outlet 116 may include, for instance, a mechanical or electromechanical shutter for controlling the quantity of coffee beans entering the grinder 110, similarly to the coffee beans outlet 112 described above.

The grinder 110 grinds the coffee beans before the ground coffee beans exit the grinder 110 via the ground coffee outlet 120. The ground coffee beans enter the brewing chamber 102 via the coffee beans dosing point 122. The ground coffee outlet 120 may include, for instance, a mechanical or electromechanical shutter for controlling the quantity of ground coffee being dosed to the brewing chamber 102. The ground coffee outlet 120 may, for example, be employed to dose the (further) fractions of the mass of ground coffee for each of the plurality of brewing steps.

By incorporating a grinder 110 in the apparatus 100, the coffee beans may be ground to the desired grind size. Any suitable grinder design may be contemplated, e.g. utilizing a disc grinder. Control over the grind size may be achieved, for example, by controlling the distance between the grinding discs. The same grind size of the coffee beans may be provided for each of the respective brewing steps, such that the taste characteristics of the resulting coffee beverage portion may be comparable to those of a coffee beverage brewed using the same ground beans in a single brewing step process.

Other designs for the ground coffee supplier 104 will be immediately apparent to the skilled person. For example, the grinder 110 may be omitted if it is desired to employ pre-ground coffee beans in the apparatus 100. As mentioned above, the dosing unit is also entirely optional.

The apparatus 100 has a water supply 124 for supplying water to the brewing chamber 102. The water outlet 126 of the water supply 124 is connected to the inlet 128 of the brewing chamber 102.

The water supply 124 supplies heated water to the brewing chamber 102. The heated water may, for example, be at a temperature between 65 and 95° C. Steam may also be supplied by the water supply 124 to a separate output for frothing milk.

The heated water may be at a temperature which is the same for each of the plurality of brewing steps. The same brewing conditions may thus be used in each of the brewing steps as, for instance, for a single brewing step process using this heated water. Accordingly, the coffee beverage portion may have comparable taste characteristics with respect to those of the product of such a single brewing step process.

The water supply 124 may, for example, comprise a water reservoir, a pump and a heater (not shown). As is well-known per se, the pump may force the heated water into the brewing chamber 102, and through the ground coffee contained therein. The water reservoir may, for instance, be connected to a mains supply of water and/or may be manually refillable.

The water supplied by the water supply 124 enters the brewing chamber 102 via the inlet 128 and contacts the ground coffee contained in the brewing chamber 102 during each of the plurality of brewing steps. The brewing chamber 102 has an outlet 130 through which brewed coffee exits the chamber 102, e.g. into a suitable drinking vessel such as a coffee cup (not shown).

In an embodiment, the apparatus 100 comprises a discharge 132 for releasing the ground coffee from the brewing chamber 102, i.e. following the respective brewing step. The discharge 132 may, for example, include a mechanical or electromechanical shutter mechanism which opens in order to release the spent ground coffee into a suitable waste receptacle (not shown). By releasing the used coffee following the respective brewing step, the brewing chamber 102 may be vacated for subsequent brewing steps. This may enhance the control which may be exercised over the taste characteristics of the coffee beverage portion, i.e. since fresh ground coffee replaces spent coffee for each brewing step.

Whilst the apparatus 100 shown in FIG. 1 comprises a single brewing chamber 102, this is not intended to be limiting. In an embodiment, the apparatus 100 comprises a plurality of brewing chambers 102, each having a respective ground coffee supplier 104 and a respective water supply 124.

As explained above the apparatus uses a lower water delivery rate than in a conventional coffee machine and hence takes a longer time to prepare the coffee (since typically each individual brewing step has the same duration as the full brewing cycle of a conventional single cycle brewing process).

The water flow rate of a conventional coffee machine is for example 2.5 ml/s (50 ml in 20 s). A typical flow rate is in the range 1.8 ml/s to 3.6 ml/s. for example 2 ml/s to 3 ml/s. The brewing process described above makes use of a flow rate in the range 1.8/N to 3.6/N where N is the number of brewing steps. By way of example, for a two-stage brewing process, the flow rate is for example in the range 0.9 ml/s to 1.8 ml/s, for example 1.1 ml/s to 1.6 ml/s. For a three-stage brewing process, the flow rate is for example in the range 0.6 ml/s to 1.2 ml/s, for example 0.7 ml/s to 1.1 ml/s.

The coffee machine may be designed only to operate with a multiple stage brewing process. Thus, the flow rate may be fixed. However, even for an apparatus which is only to provide the multiple step brewing process, the flow rate may be adjustable as part of the taste controllability.

In another example, the coffee machine may be able to operate according to the multiple stage brewing process or according to the conventional single stage brewing process depending on the wishes of the user. For this purpose, flow rate control is needed, for example between a first flow rate and a second lower flow rate. The different flow rates are then in the different ranges as outlined above.

For this purpose, a valve may be provided in the water delivery system acting as a controllable flow rate restriction. In this way, the water pump may still be controlled on or off. Alternatively, the pump may be controlled directly for example by using a pulse width modulation control input, to deliver different flow rates.

Figure 2:
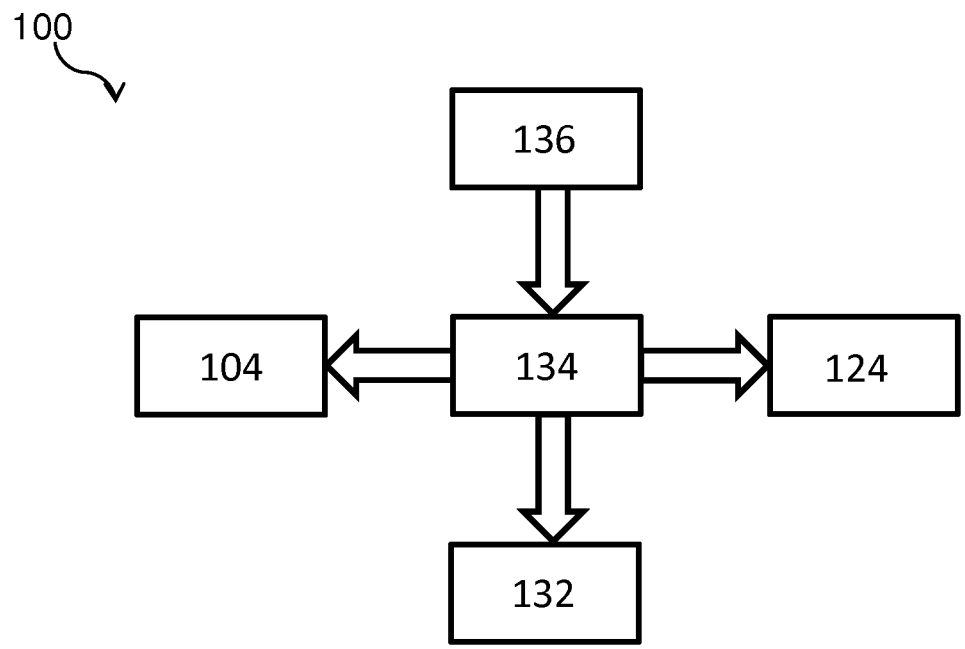
FIG. 2 shows a block diagram of an apparatus according to an embodiment.

FIG. 2 shows a block diagram of the apparatus 100 according to an embodiment. The controller 134 defines the desired brewing time or flow rate, and controls the ground coffee supplier 104 and the water supply 124 such that the coffee beverage portion is brewed in a plurality of brewing steps, as previously described.

In each brewing step, the controller 134 controls the ground coffee supplier 104 to dispense a (further) fraction of the mass of coffee beans to the brewing chamber 102. This may, for example, be achieved by the controller 134 sending a control signal to the ground coffee outlet 120 to supply the (further) fraction to the brewing chamber 102. This is represented in FIG. 2 by the arrow between the controller 134 and the ground coffee supplier 104. In a non-limiting example, the ground coffee outlet 120 may include an electromechanical shutter and the control signal may cause the shutter to open for a sufficient period of time to dose the (further) fraction to the brewing chamber 102. Alternative means of dosing the (further) fraction will be immediately apparent to the skilled person.

The controller 134 may also control the grinder 110 which is included in the ground coffee supplier 104, e.g. by controlling the duration of grinding for example by setting the number of revolutions of a rotary grinder. The (total) mass of coffee beans may, for instance, be ground to the requisite grind size, and (further) fractions of the resulting ground coffee may be dosed to the brewing chamber 102 for each of the plurality of brewing steps. Alternatively, each brewing step may, for example, involve grinding the coffee beans of the (further) fraction before dosing the (further) fraction to the brewing chamber 102.

The water supply 124 may be controlled by the controller 134 to supply the fraction of the volume of water to the brewing chamber 102, i.e. containing the (further) fraction of coffee beans. This may, for example, be achieved by the controller 134 sending a further control signal to a valve included in the water outlet 126 of the water supply 124, such that the valve opens and supplies water to the brewing chamber 102. This is represented in FIG. 2 by the arrow between the controller 134 and the water supply 124.

This control of the water supply valve may also be used to implement different modes of operation with different water delivery rates, as explained above. Alternatively or additionally, the controller 134 may trigger a pump included in the water supply 124 to pump the fraction of water to the brewing chamber 102. Again, the control of the water supply pump may be used to implement different modes of operation with different water delivery rates, as explained above.

Various means of controlling the water supply 124 using the controller 134 such that water is supplied to the brewing chamber 102 during each brewing step, and optionally with different water delivery rates, will be immediately apparent to the skilled person.

In embodiments wherein the apparatus 100 comprises a plurality of brewing chambers 102, the controller 134 may implement at least some of the plurality of brewing steps concurrently in the plurality of brewing chambers 102. In such non-limiting examples, the controller 134 may send control signals to the respective ground coffee supplier 104 to dispense coffee beans to the respective brewing chambers 102. Subsequently, the controller 134 may send further control signals to the respective water supplies 124 to supply water to the respective brewing chambers 102. In this manner, the coffee beverage portion may be prepared in a shorter time.

Alternatively, the plurality of brewing chambers 102 may each be employed to produce a respective coffee beverage portion, e.g. by each portion being produced by implementing the plurality of brewing steps sequentially in one of the plurality of brewing chambers 102. In this manner, several coffee beverage portions, each having a low diterpene content, may be produced concurrently, e.g. for several consumers.

Thus, multiple brewing arrangements may be used to implement the multiple brewing steps for preparation of a single beverage in parallel, or they may be used to prepare multiple beverages, each using a single brewing cycle, or each using multiple brewing cycles.

In an embodiment, the apparatus 100 comprises a discharge 132 which may be controlled by the controller 134 to release the (further) fraction of coffee beans from the brewing chamber 102 following one of the plurality of brewing steps, as described above. This is represented in FIG. 2 by the arrow between the controller 134 and the discharge 132. A discharge signal from the controller 134 may, for example, cause an electromechanical shutter mechanism to open in order to release the spent ground coffee into a waste receptacle. The controller 134 may further trigger the shutter mechanism to close following release of the spent ground coffee such that the brewing chamber 102 is ready to receive the (further) fraction of a subsequent brewing step. Other means of disposing of the spent coffee may be contemplated. In some non-limiting examples, the spent coffee may be manually released from the brewing chamber 102 by the user.

The controller 134 is adapted to implement the plurality of brewing steps sequentially. Such sequential implementation of the plurality of brewing steps may, for instance, be appropriate when the apparatus 100 comprises a single brewing chamber 102, or when an apparatus 100 having a plurality of brewing chambers 102 is intended to produce several coffee beverage portions concurrently, as previously described.

The apparatus 100 may comprise a user interface 136 for enabling user input of parameters relating to the coffee beverage portion and optionally also to make a selection between a slower multiple stage brewing process (for reduced diterpene) and a faster single stage brewing process. The user interface 136 may comprise any suitable component for permitting the user to input such parameters, e.g. one or more buttons, a dial, a touchscreen etc. The parameters may, for example, relate to the strength, volume etc. of the coffee beverage portion. Alternatively or additionally, the user interface 136 may permit the user to request that additional components, e.g. milk, sugar, sweetener etc. be added by the apparatus 100 to the coffee beverage portion. This user input may be sent to the controller 134, as represented in FIG. 2 by the arrow between the user interface 136 and the controller 134.

In an embodiment, the user interface 136 may enable user input of information relating to the volume and/or the mass. The controller 134 may define the desired flow rate (and hence corresponding brewing time) using this information. Alternatively or additionally, the controller 134 may define the flow rate or brewing time on the basis of the user-defined coffee strength, type etc.

Alternatively, the apparatus 100 may have a simplified design which produces a default coffee beverage portion without requiring any user selections to be made.

In a non-limiting example, the apparatus 100 may comprise a suitable switching means (not shown) for triggering the controller 134 to prepare the coffee beverage portion. The switching means may, for example, be a button which is pressed by the user, e.g. when a suitable drinking vessel is placed to receive the coffee beverage portion, i.e. being dispensed from the outlet 130. Alternatively, the switching means may be a sensor which sends an initiating signal to the controller 134 in response to placement of the drinking vessel such that it can receive the coffee beverage portion.

Automation of the preparation of the coffee beverage portion using the controller 134 in the manner described above permits the user to enjoy coffee with low diterpene (kahweol and cafestol) content without compromising taste, and with minimal or no additional actions or parts to be handled by the user.

As discussed above, embodiments make use of the controller 134 for controlling components of the apparatus 100. The controller 134 can be implemented in numerous ways, with software and/or hardware, to perform the various functions required. A processor is one example of a controller which employs one or more microprocessors that may be programmed using software (e.g. microcode) to perform the required functions. A controller may however be implemented with or without employing a processor, and also may be implemented as a combination of dedicated hardware to perform some functions and a processor (e.g. one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

FIG. 3 shows a flowchart of a method 200 of preparing a coffee beverage portion from a mass of ground coffee and a volume of water in a brewing chamber according to an embodiment. The method 200 commences in step 210. Step 210 may, for example, correspond to providing an apparatus 100 for preparing the coffee beverage portion.

In step 220, a water flow rate is defined. The apparatus may have a single water flow rate or it may depend on input from a user, e.g. according to the volume of water, the mass of coffee beans, the desired strength of the coffee beverage portion etc. In step 230, the coffee beverage portion is brewed in a plurality of brewing steps. Each brewing step comprises passing a fraction of the volume through the brewing chamber so as to contact a further fraction of the mass during a time period equal to the brewing time, i.e. as defined in step 220. The method 200 terminates in step 240.

As explained above, the coffee maker may also operate according to a conventional single stage brewing process if the user input selects a conventional brewing mode.

Low diterpene contents in coffee may be achieved by reducing the water flow rate, as previously described.

The method 200 may be better understood with the following illustrative example in which a coffee beverage portion is prepared using 10 g of coffee beans and 50 mL of water. For such a volume (50 mL) and mass of coffee beans (10 g), and taking into account user taste preferences, a brewing time of 20 s is defined. If a single brewing step were to be used, using Equation 1, the flow rate for this single brewing step would be 2.5 mL/s.

However, in this example two brewing steps are implemented, each using 5 g of coffee beans (further fraction) and 25 mL of the water (fraction). The 20 s brewing time is used for both brewing steps. The flow rate for each of these two brewing steps is thus 1.25 mL/s.

In this illustrative example, the flow rate is halved with respect to the scenario in which a single brewing step is utilized (2.5 mL/s). By virtue of lower flow rates leading to diminished diterpene, e.g. kahweol and cafestol, extraction, the coffee beverage portion produced in this example may benefit from having a lower diterpene content. The taste characteristics of the coffee beverage portion are comparable to the product of an equivalent single brewing step process, given that other key brewing parameters are left unchanged.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An apparatus for preparing a coffee beverage portion from a volume of water and a mass of ground coffee, the apparatus comprising:
   a brewing chamber for containing the ground coffee and allowing the water to pass therethrough;
   a ground coffee supplier for dispensing the ground coffee to the brewing chamber;
   a water supply for supplying water to the brewing chamber; and
   a controller adapted to:
      control the ground coffee supplier and the water supply such that the coffee beverage portion is brewed in a plurality of brewing steps, wherein each brewing step comprises passing a fraction of said volume through the brewing chamber so as to contact a further fraction of said mass, the controller being configured to, in each brewing step, control the ground coffee supplier to dispense said further fraction to the brewing chamber, and wherein the controller is adapted to implement the plurality of brewing steps sequentially.

2. The apparatus of claim 1, wherein a ratio between the fraction and the further fraction is equal to a further ratio between the volume and the mass.

3. The apparatus of claim 1, wherein the fraction is half of the volume and the further fraction is half of the mass.

4. The apparatus of claim 1, wherein the water supply is adapted to supply heated water at a temperature which is the same for each of the plurality of brewing steps.

5. The apparatus of claim 1, further comprising a discharge for releasing the ground coffee from the brewing chamber.

6. The apparatus of claim 5, wherein the controller is further adapted to control the discharge to release the further fraction following the respective brewing step.

7. The apparatus of claim 1, further comprising a user interface adapted to enable user input of parameters relating to said coffee beverage portion.

8. The apparatus of claim 7, wherein the user interface is further adapted to enable user input of information relating to said volume and/or said mass, the controller defining time for each brewing step using said information.

9. The apparatus of claim 7, wherein the user interface is further adapted to enable user input for selecting brewing with a plurality of brewing steps, or brewing with a single brewing step.

10. The apparatus of claim 1, further comprising a beans chamber for receiving coffee beans and a grinding arrangement for grinding the coffee beans to provide the ground coffee.

11. A method of preparing a coffee beverage portion from a mass of ground coffee and a volume of water in a brewing chamber, the method comprising:
   brewing the coffee beverage portion in a plurality of brewing steps, wherein each brewing step comprises passing a fraction of said volume through the brewing chamber so as to contact a further fraction of said mass, said further fraction being, in each brewing step, dispensed to the brewing chamber, and wherein the plurality of brewing steps are implemented sequentially.

12. The method of claim 11, wherein a ratio between the fraction and the further fraction is equal to a further ratio between the volume and the mass.

13. A control unit for preparing a coffee beverage portion from a volume of water and a mass of ground coffee in a brewing chamber, the control unit being adapted to control brewing of the coffee beverage portion in a plurality of brewing steps, wherein each brewing step comprises passing a fraction of said volume through the brewing chamber so as to contact a further fraction of said mass, said further fraction being, in each brewing step, dispensed to the brewing chamber, and wherein the plurality of brewing steps are implemented sequentially.

14. The control unit of claim 13, wherein the control unit is further adapted to control a discharge to release the further fraction from the brewing chamber following one of the plurality of brewing steps.

15. The control unit of claim 14, wherein the control unit is further adapted to control an electromechanical shutter mechanism to control the discharge.

16. The control unit of claim 13, wherein the control unit is further adapted to control a supply of water to the brewing chamber such that the coffee beverage portion is brewed in the plurality of brewing steps.

17. The control unit of claim 13, wherein the control unit is further adapted to, in each brewing step, control a ground coffee supplier to dispense said further fraction to the brewing chamber.

\* \* \* \* \*